Dec. 25, 1951  H. E. L. OWEN ET AL  2,579,956
DISTANCE MEASURING DEVICE AND THE LIKE
Filed July 11, 1949
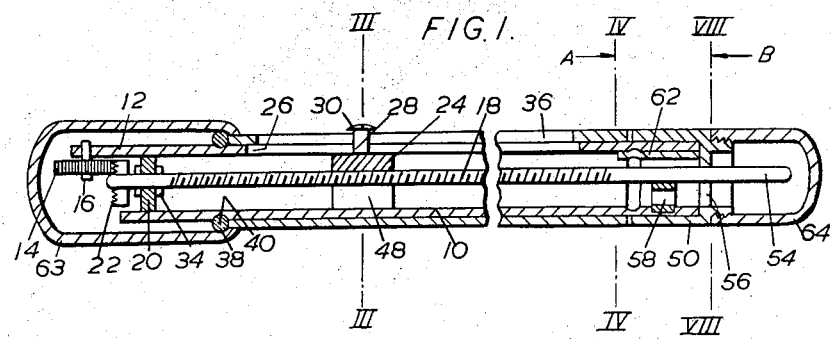
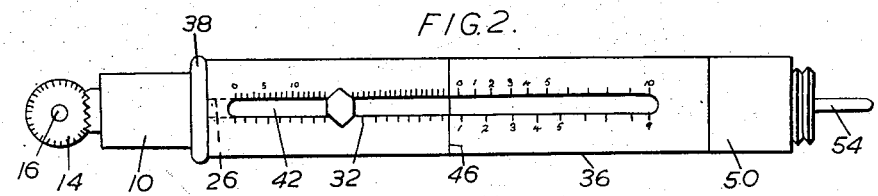
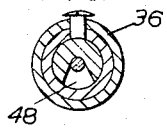
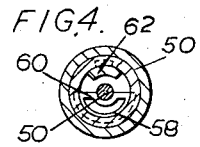
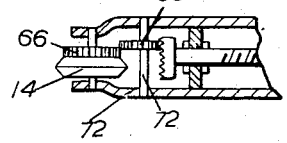
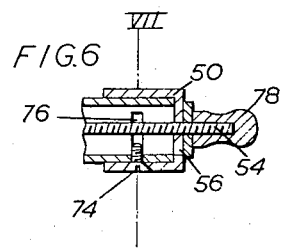
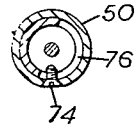
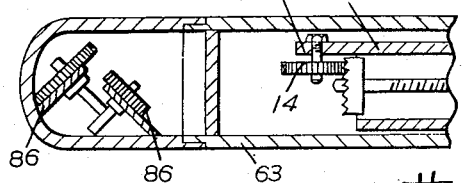
Inventors
Henry Ernest Lloyd Owen
Henry Thomas Gurton
By Dowell & Dowell
Attorneys Patented Dec. 25, 1951

2,579,956

UNITED STATES PATENT OFFICE 2,579,956

DISTANCE MEASURING DEVICE AND THE LIKE

Henry Ernest Lloyd Owen and Henry Thomas Gurton, Chiswick Village, London, England Application July 11, 1949, Serial No. 103,992
In Great Britain July 13, 1948

3 Claims. (Cl. 33—141)

1

This invention relates to distance measuring devices and the like and more particularly to such devices for measuring distances on charts and the like.

Navigators and surveyors frequently have to measure distances on charts, maps and the like under difficult conditions and the object of the invention is to provide a measuring device to facilitate this task.

According to the invention a device for measuring distances on charts and the like comprises a tubular holder having a toothed chart wheel rotatably mounted thereon and engaging directly or indirectly with a screw threaded rod rotatably mounted on a longitudinal axis within the holder, a screw threaded nut mounted within the holder and threaded onto the rod, the rod or nut being held against axial movement within the holder while the nut or rod respectively is free to move axially within the casing and carries a pointer extending transversely through a slot in the holder adjacent to which is a scale or scales on the outer surface of the holder. The arrangement is such that when the chart wheel is rolled over the surface of a chart or the like, it causes the nut or rod to move axially with respect to the holder thus moving the pointer along the scale or scales to record the distance traversed by the chart wheel.

To enable the invention to be more fully understood it will now be described with reference to the accompanying drawings in which:

Fig. 1 is a cross-section through a measuring device constructed according to the invention, Fig. 2 is a side view of the device shown in Fig. 1 but with the caps omitted.

Fig. 3 is a cross section on the line III—III in Fig. 1,

Fig. 4 is a plan view of the cap 50 on the line IV—IV of Fig. 1 looking in the direction of arrow "A."

Fig. 5 is a cross section of the chart wheel end of another construction according to the invention, Fig. 6 is a cross section of the other end of another construction according to the invention, Fig. 7 is a cross section on the line VII—VII of Fig. 6, Fig. 8 is an end view of the cap 50 in Fig. 1 on the line VIII—VIII looking in the direction of the arrow "B" and Fig. 9 is a cross section of the chart wheel end of another construction according to the invention.

Referring to the drawings, the construction

2 shown in Figs. 1-4 and Fig. 8 shows a chart measurer having a tubular holder 10 with an extension 12 on one end thereof on which a toothed chart wheel 14 is rotatably mounted by means of a pintle 16. A rod 18 journalled in a block 20 fast in the holder 10 is rotatably arranged within the holder and has a gear wheel 22 rigidly secured thereto so that the teeth project beyond the end of the holder 10 and mesh with the teeth on the wheel 14. A nut 24 slidably arranged within the casing has an internally screw threaded bore and is screwed onto the rod 18. A longitudinal slot 26 is provided in the holder 10 and a projection or the like 28 secured to the nut 24 is arranged to extend outwardly through this slot and has a pointer 30 on its outer end registering with a scale or scales 32 on the outer face of the holder adjacent to the longitudinal edges of the slot 26.

Thus if the chart wheel is rolled under pressure over a chart, map, plan or the like it revolves and through the gear wheel 22 rotates the rod 18 to move the nut 24 longitudinally in the holder so that the pointer 30 moves over the scale 32 to record the distance travelled by the wheel 14 over the chart or the like. As the chart wheel 14 is turned the movement of the nut 24 and pointer 30 will be proportional to the angle through which the wheel is turned and the scale over which the pointer moves will indicate the distance through which a point on the periphery of the wheel has moved. The scale is marked on the equivalent scale of the chart or the like so that the pointer will record the actual distance represented by the chart along which the wheel has been moved. Thrust collars 34 are secured on the rod 18 to prevent axial movement thereof within the casing.

A cylindrical scale sleeve 36 is slidably located on the outside of the holder 18 and is located in position by any suitable means such as spring rings 38 clipped in grooves 40 in the holder. The scale sleeve has a longitudinal slot 42 which when the scale sleeve is in place registers with the slot 26 in the holder. The scale sleeve is double ended and has two scales on either side of the centre dividing line 46 against which the pointer 30 registers. It will be understood that one or more scales may be engraved on the outer surface of the holder if desired, additional longitudinal slots being provided in the scale if necessary. The four scales on the scale sleeve 36 are to different measurements such as 1" to 1 mile, 1" to 4 miles, 1" to 1 foot and so on and the scale can be slipped off the holder over one or other. The ring 38 is removably retained in an annular recess in the holder and frictionally bears against the end of the sleeve 36. By removal of the ring 38, the scale sleeve 36 may be slid off of the holder and reversed if desired. The scale sleeve may be made of any suitable material such as plastic, Celluloid or metal and the scales are preferably engraved thereon but may be inscribed or otherwise marked thereon; the scales may be dyed in one or more colours to assist in reading them. The scale sleeve may be of transparent material and spaced away from the holder to enable the pointer to slide between the holder and the scale sleeve. The pointer may be coloured if desired to enable it to be more readily visible.

To facilitate rapid setting of the device a quick-release mechanism may be provided such as is shown in Figs. 1-3. For this purpose the nut 24 has a cut away portion 48 (Fig. 3) of such a size that the rod 18 may be moved transversely to disengage the threads of the nut. The rod is sufficiently resilient so that owing to its length it will flex for this purpose. The end of the holder 10 is closed by a removable cap 50 having a central bore 52 through which the free end 54 of the rod passes. The bore 52 is elongated into a radial slot 56 (Fig. 8) in line with the cut away portion 48 of the nut 24 thereby permitting transverse movement of the rod 18. A spring 58 shown in Figs. 1 and 4 as D-shaped, but which may be of any suitable known type, is secured in the cap 50 and has an indentation 60 (Fig. 4) therein arranged to engage the rod 18 when the cap is in position on the holder. The cap may be held in place by any known means such as a bayonet joint on the spring 62 shown in Figs. 1 and 4. Any known type of blade, wire annular or other clamping spring may be employed.

To set the device for use, the end 54 of the rod is pressed against the spring 58 to disengage it from the nut 24 which may then be slid in the holder to zero position on the scale, by the operator by means of the pointer 30. The end 54 is then released and is returned by the spring 58 to the central position to reengage the threads in the nut 24.

A cover 63 may be provided to cover the chart wheel when the device is not in use. This cap may be provided with an internal annular groove, ridge or spring member (not shown) adapted to slip over the ring 38 and hold it in position.

Another cover 64 may be provided for the other end of the holder and is preferably shaped so that its open end engages the end of the scale sleeve 36 when in position on the holder to secure the scale sleeve in position; in this construction a ring 38 is not used on this end of the holder: or the cover may be formed with an annular groove, ring or spring similar to that on the cover 63 to clip over a ring 38 to that end of the holder.

Referring to Fig. 5, the chart wheel 14 is shown as having a conical circumference which may or may not be milled, roughened or serrated to grip the chart or like surface. The chart wheel has an integral gear wheel 66 meshing with a gear wheel 68 journalled on pintle 70 in the extensions 72 on the holder. The wheel 68 in turn meshes with the wheel 22.

Figs. 6 and 7 show another construction for the operation of the quick-release mechanism. The cap 50 is secured in place on the holder 10 by the grub screw 74 engaging a circumferential groove 76, in the holder 10, which is shown as extending approximately half way round the holder, but it need only extend a sufficient distance to ensure displacement and return of the rod 18 as will be explained. The groove 76 and the slot 56 in the cap are so positioned that in one position the rod 18 is held centrally in the slot 56 since the slot 56 extends in the opposite direction to the slot 48 in the nut 54. If the quick release is to be operated the cap 50 is turned on the holder so that the slots 48 and 56 are in alignment. Pressure on the end 54 of the rod 18 will now permit the release of the rod from the nut 24. When the pointer has been set the reverse procedure is carried out. It will be seen that the cap 50 need only be turned through a sufficient angular distance to lock the rod in position in engagement with the nut thread.

The above quick release mechanism permit rapid setting of the pointer on the scale, but final adjustment may be necessary by hand rotation of the chart wheel 14 to effect an accurate setting.

The end rod 54 of the rod 18 may be covered by a knob or the like 78 which if desired may be tightened by screwing onto the rod to lock the rod against quick release.

Referring to Fig. 9 a further construction of the chart wheel arrangement is shown. The chart wheel 14 is removably journalled in the extension 12 of the holder by means of a lock-nut 80 or the like. The cover 63 is provided with a container 82 formed with a top 84 removably attached to the cover as by screw threading. This pocket may be used to house spare chart wheels 86 of different size to the wheel 14; these are preferably complete with pintles and if desired brackets holding the pintles and adapted to be secured to the end of the holder so that the chart wheel is in mesh with the gear wheel 22; the extension 12 of the casing is provided with several bores for pintles of different sized chart wheels, or the extension 12 may be adjustably arranged on the holder 10.

It will be seen from the above description that the nut 24 is held by the projection 28 in the slot 26 against rotation in the holder. In another construction the rod may be slidably arranged in the holder and held against rotation, while the nut is held against axial movement in the holder but is free to rotate therein. The projection 28 and pointer 30 are rotatably mounted on the rod. In this construction the gear wheel 22 is mounted on or connected to the nut. It will be appreciated that in this construction the nut or its connection to the gear wheel 22 will extend a substantial distance into the holder which will be longer for a given length of scale 32 to provide room for the displacement of the rod. The rod may be allowed to project a greater or less distance through the cap 50 if desired to reduce the holder length.

In the case where the pointer 30 is located beneath the scale sleeve 36, the sleeve may have several scales arranged longitudinally and parallel to one another around the sleeve, so that by rotating the sleeve the requisite scale may be positioned against the pointer. A spring pressed plunger engaging slots in the end of the sleeve or other means may be provided to lock the sleeve in the appropriate position. The use of such a sleeve is advantageous as it keeps the nut and rod free from dirt.

In measuring the distance between two points, the wheel must be turned always in the same sense so that the nut moves always in the same direction. To enable the device to be used more readily for measuring distances greater than the distance represented by any one of the scales, pairs of scales running in opposite directions and graduated so as to be a continuation one of the other can be provided. In that case, when the nut has reached the limit of its movement in one direction, the wheel can be made to roll in the opposite sense over the remaining distance to be measured so that the movement of the nut is reversed. The distance would then be read directly off the continuation scale.

The chart wheel should have a narrow peripheral surface to enable the user to follow the chart or the like accurately. In use the holder can be held either normally to the surface of the chart or the like or at a considerable angle thereto.

In another construction the nut may be rotatably mounted in the tubular holder, but prevented from axial movement thereon. The rod, screw-threaded and carrying the pointer, or the like, is engaged in the screw-threaded bore in the nut and arranged for axial movement within the holder. The chart wheel through gearing as hereinbefore described causes the nut to rotate and thus move the rod axially within the casing as the chart wheel is moved over the chart or the like. In this case the pointer or the like will be carried on the rod.

In yet another construction the chart wheel is mounted on a bearing bracket rotatably mounted on the tubular holder about an axis substantially parallel or in line with the longitudinal axis of the tubular holder. The axis about which the chart wheel rotates on the bracket is preferably arranged offset from the axis of rotation of the bracket so that this chart wheel assembly will operate in the manner of a castor as the chart wheel is moved across the chart. In such a construction the chart wheel is prevented from rotation in the wrong direction since if this were attempted the castor action of the chart wheel assembly would cause the chart wheel to swing over the dead-centre. However by reversing the direction of movement of the chart wheel over the chart or the like the chart wheel assembly would revolve on the tubular holder through an angular distance of about 180° and this would cause the pointer or the like to record on the holder scale a movement of the chart wheel over the chart equal to about half a turn of the chart wheel. Means are preferably provided to compensate for any such possible inaccurate record on the scale.

The chart wheel is of thin sheet material, steel or like suitable material and the teeth thereon assist in preventing the wheel slipping over the map or like surface. The chart wheel may be mounted at an angle to the rod axis so that although the teeth mesh with the circumferential teeth of the gear wheel, the diametrically opposite teeth of the chart wheel lie substantially on the axis of the rod.

The measuring device in accordance with the invention can be made of conveniently small size. In the preferred form, it is roughly of the size of a fountain pen and is made so that it can be carried in much the same way as a fountain pen is carried, being provided, if desired, with a clip of the fountain pen type.

The device may be used as a calculator, in which case some or all of the scales may be graduated in other units of measurement, such as weight, volume or currency values, and so on. Thus, if it is required to calculate the cost of a journey or the fuel consumed, the chart wheel is run over the distance on the chart and the cost of the journey, the fuel consumption or other information may be read direct off the scale. The term "measuring" as used in the specification and claims is therefore not limited to linear or like measurement, but includes the calculation of other factors related to the distance traversed by the chart wheel.

We claim:

1. A device for measuring distances on charts and the like comprising a tubular holder having a longitudinal slot through its surface, a screw threaded rod rotatably mounted in said holder to rotate about a longitudinal axis within said holder, a toothed chart wheel rotatably mounted in said holder and operatively connected to said rod to rotate it, a screw threaded nut mounted within said holder and threaded onto said rod, the rod being held against axial movement within said holder and the nut being held against rotation in said holder, a pointer mounted on said nut and extending into said slot, and a sleeve having a plurality of different scales mounted on said holder and being adjustable thereon to bring any desired scale into registry with said slot and pointer, a radial slot in said nut to enable said rod to be moved transversely in said holder out of engagement with said nut thread, a cap having a radial slot therein through which the free end of said rod passes secured against rotation on the end of the holder remote from the chart wheel with the slot in alignment with said slot in said nut, a spring in said cap arranged to maintain said rod in engagement with said nut thread but on movement of said rod end against the action of said spring will disengage said rod from the nut threads to permit rapid axial movement of said nut and pointer with respect to said scale.

2. A chart measuring device according to claim 1 in which said spring is D-shaped and is arranged so that its flat portion engages said rod end to urge the rod into engagement with the nut thread, a detent being formed on said flat portion normally to position said rod centrally in said holder.

3. A chart measuring device as set forth in claim 1 wherein said sleeve is transparent and is rotatably disposed on said holder overlying said slot and said pointer therein, said scales comprising circumferentially spaced rows of indicia any row of which may be brought into registry with said slot by rotation of said sleeve on said holder; and detent means for positively maintaining said sleeve in a selected position of registry.

HENRY THOMAS GURTON.
HENRY ERNEST LLOYD OWEN.

REFERENCES CITED

The following references are of record in the file of this patent:

UNITED STATES PATENTS

| Number | Name | Date |
|---|---|---|
| 208,101 | Kethledge | Sept. 17, 1878 |
| 997,648 | Cavanaugh | July 11, 1911 |
| 1,383,340 | Robbins | July 5, 1921 |
| 2,188,201 | Deidrich | Jan. 23, 1940 |
| 2,522,030 | Fuqua | Sept. 12, 1950 |

FOREIGN PATENTS

| Number | Country | Date |
|---|---|---|
| 48,261 | Germany | Aug. 15, 1889 |
| 103,274 | France | May 4, 1874 |
| 907,924 | France | July 30, 1945 |